United States Patent [19]

Rentschler

[11] Patent Number: 5,061,150
[45] Date of Patent: Oct. 29, 1991

[54] SINGLE-HANDED SKIDDING APPARATUS FOR LOGS AND THE LIKE

[76] Inventor: John Rentschler, 824 Rentschler La., Toppenish, Wash. 98948

[21] Appl. No.: 331,645

[22] Filed: Mar. 31, 1989

[51] Int. Cl.⁵ .............................................. B66C 1/12
[52] U.S. Cl. .................................... 414/703; 414/734; 414/739; 144/335; 294/88; 37/2 R
[58] Field of Search .................. 294/88; 37/2 R, 231, 37/234; 414/703, 731, 732, 734, 739, 569, 538, 559; 144/3 D, 335

[56] References Cited

U.S. PATENT DOCUMENTS

| 561,674 | 6/1896 | Kuriger | 414/739 |
|---|---|---|---|
| 2,520,722 | 8/1950 | Irrer | 414/734 |
| 2,893,778 | 7/1959 | Eckstein | 294/110 |
| 3,034,821 | 5/1962 | Hackett et al. | 294/88 |
| 3,477,596 | 11/1969 | Michaelson | 414/734 X |
| 3,513,998 | 5/1970 | Stone | 214/147 |
| 3,667,796 | 6/1972 | Funk | 294/88 |
| 3,722,706 | 3/1973 | Blonsky | 414/694 X |
| 3,782,567 | 1/1974 | Likas et al. | 214/77 |
| 3,841,507 | 10/1974 | Barwise | 414/734 X |
| 3,904,232 | 9/1975 | Byles | 294/88 |
| 3,972,431 | 8/1976 | Fischer | 214/147 |
| 3,985,384 | 10/1976 | Hahn | 414/739 X |
| 4,005,894 | 2/1977 | Tucek | 294/88 |
| 4,023,848 | 5/1977 | Bennett | 294/88 |
| 4,067,471 | 1/1978 | Roatcap | 414/703 |
| 4,260,323 | 4/1981 | Muntjanoff | 414/371 |
| 4,315,652 | 2/1982 | Barwise | 414/732 X |
| 4,379,674 | 4/1983 | Meisel et al. | 414/699 |
| 4,645,410 | 2/1987 | Royer | 414/740 |
| 4,718,816 | 1/1988 | King | 414/739 |

FOREIGN PATENT DOCUMENTS 1013392 4/1983 U.S.S.R. .
743018 1/1956 United Kingdom ................ 414/732

OTHER PUBLICATIONS

Harry Ferguson, Inc., Detroit, Mich., "The Ferguson Rear-Mounted Crane", 1949, HF-49-2024.

Primary Examiner—Robert J. Spar
Assistant Examiner—James T. Eller, Jr.
Attorney, Agent, or Firm—George A. Cashman

[57] ABSTRACT

An apparatus for single-handed operation in skidding logs, stumps, poles and the like. An A-frame with rearwardly-extending beam is attached to the three-point hitch of a tractor. A fluid-operated grapple, which will inherently adjust to various shapes and sizes of objects, is suspended from the rearward end of the beam. A chain, having a small amount of slack, is connected by its ends to the grapple tongs, and is rove around sleeved bolts near the draft arm attachment points. When the object to be skidded is grappled and lifted, the operator moves the tractor in the desired direction, and the chain immediately takes the towing load.

4 Claims, 5 Drawing Sheets

SINGLE-HANDED SKIDDING APPARATUS FOR LOGS AND THE LIKE

BACKGROUND OF THE INVENTION

1. Field of the Invention.

Management of forested property often requires the removal of windfall logs, stumps and other debris without environmentally harming or disturbing seedling trees, young trees and undergrowth. Likewise, management of commercial orchard property often requires interplanting of young trees among old trees, and eventual removal of the old trees without disturbing the younger trees. Hiring of the customary heavy equipment and a crew is expensive, and is usually damaging to the environment.

As a consequence, I have invented an apparatus which attaches to the three-point hitch of a tractor, such as an orchard tractor, and which can be operated solely by the tractor driver, to lift one end of the object to be moved, and then to utilize a chain secured near the two tow points of the hitch and attached to the pickup tongs, to enable the tractor operator to skid the load to another location without imposing any additional load on the pickup tongs.

2. Description of Related Art.

Typically, in orchard clearance and forest maintenance, one or more people will wrap a cable or chain around the object to be moved, and will attach the cable or chain to a tow point on a truck or tractor. This is not only expensive in terms of labor costs, but it can get quite dangerous at times. Machinery for picking up and carrying or skidding logs or trees is generally large, specialized, expensive, and often inappropriate, considering the surroundings in which the work is to be done.

U.S. Pat. No. 2,893,778 to Eckstein discloses an automatic tongs for mounting on a shovel or boom. The device incorporates a pair of chains which are not used for hauling, but only for the purpose of opening the tongs. The pickup device takes the skidding load. In U.S. Pat. No. 3,782,567 to Likas et al., chains are used to enclose various sizes of load, but only to secure the load to the vehicle. The grapple takes the towing load. That is also the case, but without the chains, in the devices in U.S. Pat. Nos. 3,513,998 to Stone, 4,379,674 to Meisel, Jr. et al. and 4,645,410 to Royer. U.S. Pat. No. 3,972,431 to Fischer discloses a log grapple unit which also has a separate winch. The precise use of the winch is not disclosed, except for the following statement: "The winch unit 28 includes a line or cable 30 which is trained over a portion of the arch structure 26 for engaging a load to be towed by the vehicle." The cable appears in no way to be attached to the pickup device and presumably would have to be attached to the load by hand. U.S. Pat. No. 3,034,821 to Hackett discloses a device for picking up the entire load, not for skidding the load. U.S. Pat. Nos. 4,005,894 to Tucek, 4,023,848 to Bennett, 4,260,323 to Muntjanoff and U.S.S.R. Patent SU 103392 A to Forest Power Mechanical Institute simply disclose various designs of grapple heads, and do not disclose means for moving the load. The U.S.S.R. patent discloses a grapple head or tongs which is closer to the grapple part of my invention than any other, but which differs in vital respects. Examination of element 5 of the Soviet patent seems to show that it is not pivoted at its center, but rather is affixed to the lower end of piston rod 4. In contrast, the corresponding element of my invention, lower crosslink 46 is pivotally attached to the lower end of piston rod 40. In addition, the thrust of the Soviet patent is the ability of the tongs to be rotated by pressurizing a cylinder. In my invention, the grapple adapts to the orientation of the load whereas, in the Soviet patent, the grapple must be positioned by the operator.

SUMMARY OF THE INVENTION

This invention is designed for use with a three-point tractor hitch. It can also be used with a three-point hitch that is adapted for mounting on the front of a truck.

The three point hitch is the most commonly used hitch on farm tractors today. The tractor transmission has a shaft extending out sideways from each side of the rear portion of the transmission case. These two shafts rotate together, and are controlled by the operator through a hydraulic system using a single control handle. A draft bar is fixedly attached to each of the shafts. The draft bars extend rearward to a point in back of the tractor's rear wheels. The free end of each draft bar has a cylindrical horizontal hole for the attachment of an agricultural implement. Sometimes the free end of the draft bar is fitted with a ball-and-socket joint, having a cylindrical attachment hole in the ball. The third point of the three-point hitch is a rod of adjustable length which is rotatably attached to the tractor at a point above the draft bars, and well forward of the attachment points. When the operator decides to move from one field to another, or simply to cease tilling and move the tractor off the tilled area, he utilizes the hydraulic system to rotate the draft bars upward, and thereby raises the implement above the ground.

The arrangement of this invention is that of a rotatable gallows frame with a suspended grapple, and a chain connecting the tongs of the grapple to the base of the gallows frame.

This invention comprises a base channel having a hitch attachment at each end for connection to the draft bars of the hitch. The open side of the channel faces rearward from the tractor. A box girder is welded to each end of the upper flange of the channel. The box girders converge and are welded at their upper ends to a beam which extends horizontally back from the point where the box girders meet. A crossbar is welded to the box girders about one-third of the way down from the convergence point to the channel. A bracket having a cylindrical hole for attachment to the third point of the hitch extends forward from the center of the cross brace. A beam support brace is welded to the center of the crossbar and extends angularly upward and is welded to the beam at a point about two-thirds of the length of the beam from its point of attachment to the box girders. A shackle is rotatably suspended from a pad at the free end of the beam. An upper crosslink is rotatably suspended from the shackle. A hydraulic cylinder is rotatably suspended from the center of the upper crosslink by means of a clevis pin, which limits rotation of the hydraulic cylinder to a plane coinciding with that of the crosslink. A lower crosslink is rotatably suspended from the piston rod which extends from the lower end of the hydraulic cylinder, also by a clevis pin. A tong bar, of fixed length, having a bifurcated fitting at each end, is rotatably suspended from each end of the upper crosslink. A tong, made of steel plate, is rotatably attached to the lower end of each of the tong bars at about the midpoint of the tong. The upper or shank end of the tong is rotatably attached to one end of the lower crosslink.

A bolt extends through the upper and lower webs of the channel near each end. The portion of each bolt within the channel is fitted with a rotatable hardened-steel sleeve which extends almost completely across the web.

Each tong is fitted with a U-bolt on the side nearest the tractor. A chain is attached to one of the U-bolts, and then is rove around the towing bolt sleeves and attached to the U-bolt on the other tong. The result is a U-shaped disposition of the chain. The chain has some slack when the cylinder and tongs are unloaded and hanging straight down.

A longer chain may be used, and may be disposed in an X-shape, if desired, by passing it from one U-bolt around the sleeve on the other side of the tractor centerline, then around the sleeve on the same side of the centerline, and then brought across the centerline again for securing to the other U-bolt.

To use the apparatus, the operator tilts the apparatus up, if necessary, by rotating the draft arms, and backs the tractor up near the stump or log or pole to be skidded. The operator opens the tongs by extending the tong cylinder rod downward. He lowers the tongs to the object using the draft arms, and closes the tongs around the object with the tongs cylinder. With the tongs firmly grappling the object, the operator raises the object off the ground by rotating the apparatus upward, and then drives away in the desired direction. The slack, if any, immediately comes out of the chain, and the chain takes the skidding load.

The purpose of the rotatable sleeves around the tow bolts is to prevent wear of the bolts, while allowing the chain to slide so as to adjust to uneven size objects, such as stumps.

A further benefit of the skidding load being taken immediately by the chain is that the grapple stays in much the same position as when it picked up the load, thereby maintaining a good purchase on the object being skidded.

DESCRIPTION OF THE PREFERRED EMBODIMENT

Figure 1:
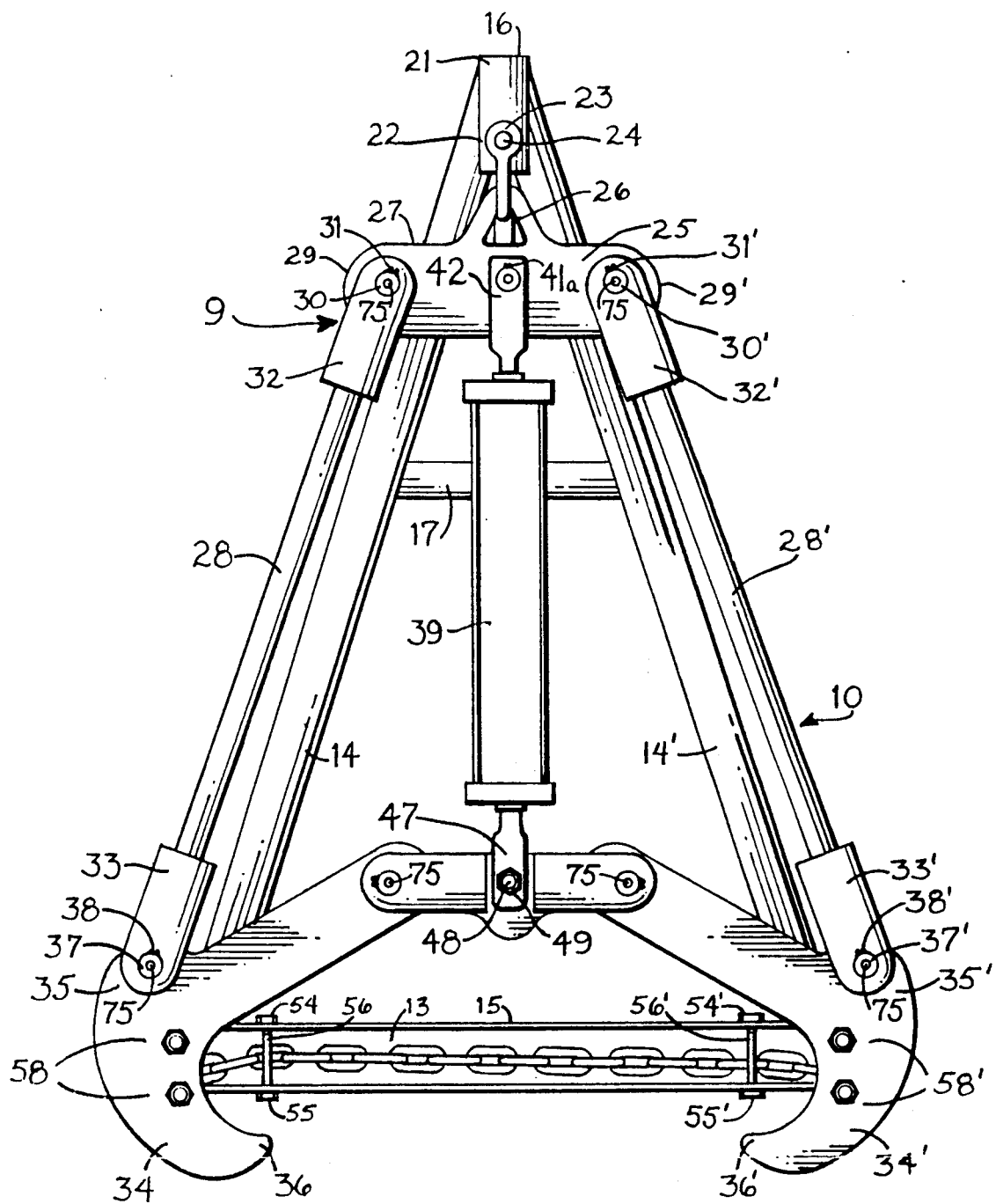
FIG. 1 is an elevational view of the apparatus from a point behind the tractor, with the apparatus in an unloaded condition.

In this specification, the words "backward", or "rearward", or derivations thereof, are intended to refer to a direction from the vehicle hitch toward the load. Likewise, the words "front" or "forward", or derivations thereof, are intended to refer to a direction from the load toward the vehicle hitch.

The apparatus 9, and all parts thereof, except for the hydraulic hose, is made of steel.

The apparatus 9 is attached to the draft bars of the hitch by means of pins (not shown) which extend through towing holes 11 and 11' in end plates 12 and 12' at each end of a channel 13. The open side of the channel 13 faces rearward. Legs 14 and 14' are welded to the upper surface 15 of the channel 13 at its ends, and converge to a point where they are welded to each other and to a beam 16, which extends rearward in a plane perpendicular to that of the legs 14 and 14'. A cross brace 17 is welded to legs 14 and 14' to form an A-shape. A hitch attachment 18 is welded to the center of the forward face of crossbrace 17. Hitch attachment 18 is provided with a cylindrical hole 19 for rotatable attachment of the apparatus 9 to the third point of the hitch. Support brace 20 extends angularly upward from the cross brace 17 to the beam 16, and is welded at its ends to the crossbrace 17 and the beam 16. A beam closure plate 21 at the end of the beam 16 has a downward extending tab 22. The tab 22 is provided with a hole (not shown) to allow a shackle 23 to be rotatably suspended therefrom by its pin 24.

A grapple 10 is suspended from the shackle 23. An upper crosslink 25 is loosely suspended from the shackle 23 through eye 26 extending upwards from the upper edge 27 of the upper crosslink 25. Tong bars 28 and 28' are rotatably suspended from the ends 29 and 29' of the upper crosslink 25 by pins 30 and 30' and snap rings 31 and 31'. Tong bars 28 and 28' are identical, and each terminates in a bifurcated fitting at each end. Tong bar 28 has fitting 32 at its upper end and fitting 33 at its lower end. Tong bar 28' has fitting 32' at its upper end and fitting 33' at its lower end. Two generally hook-shaped tongs 34 and 34' each have an extended pivot area 35 and 35' respectively at the edge opposite the points 36 and 36' respectively of the tongs 34 and 34'. The lower fittings 33 and 33' of tong bars 28 and 28' respectively are rotatably attached to the tongs 34 and 34' respectively by means of pins 37 and 37' and snap rings 38 and 38' respectively extending through holes (not shown) in the extended pivot areas 35 and 35'.

Figure 2:
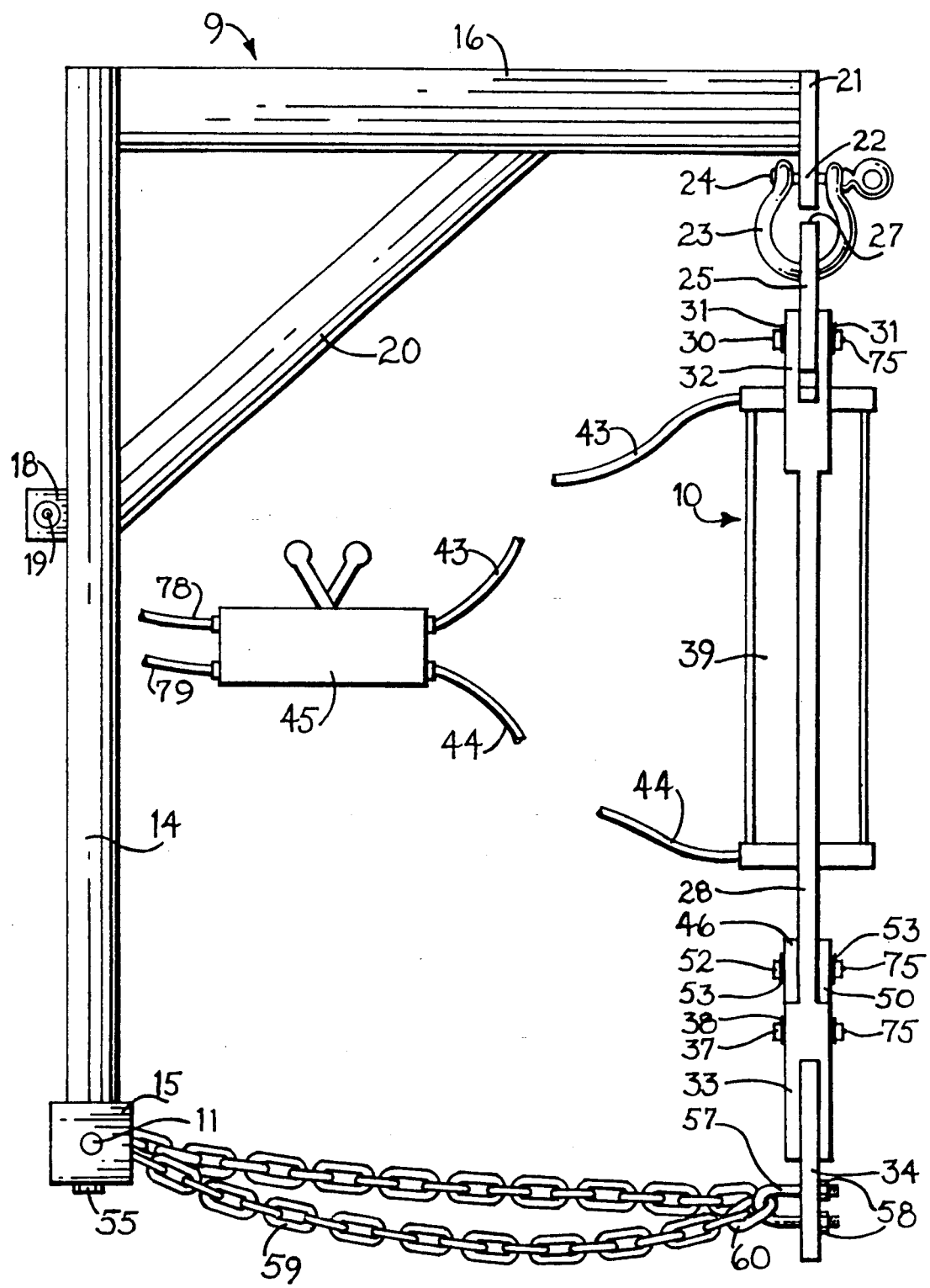
FIG. 2 is a side view of the apparatus in an unloaded condition.
Figure 3:
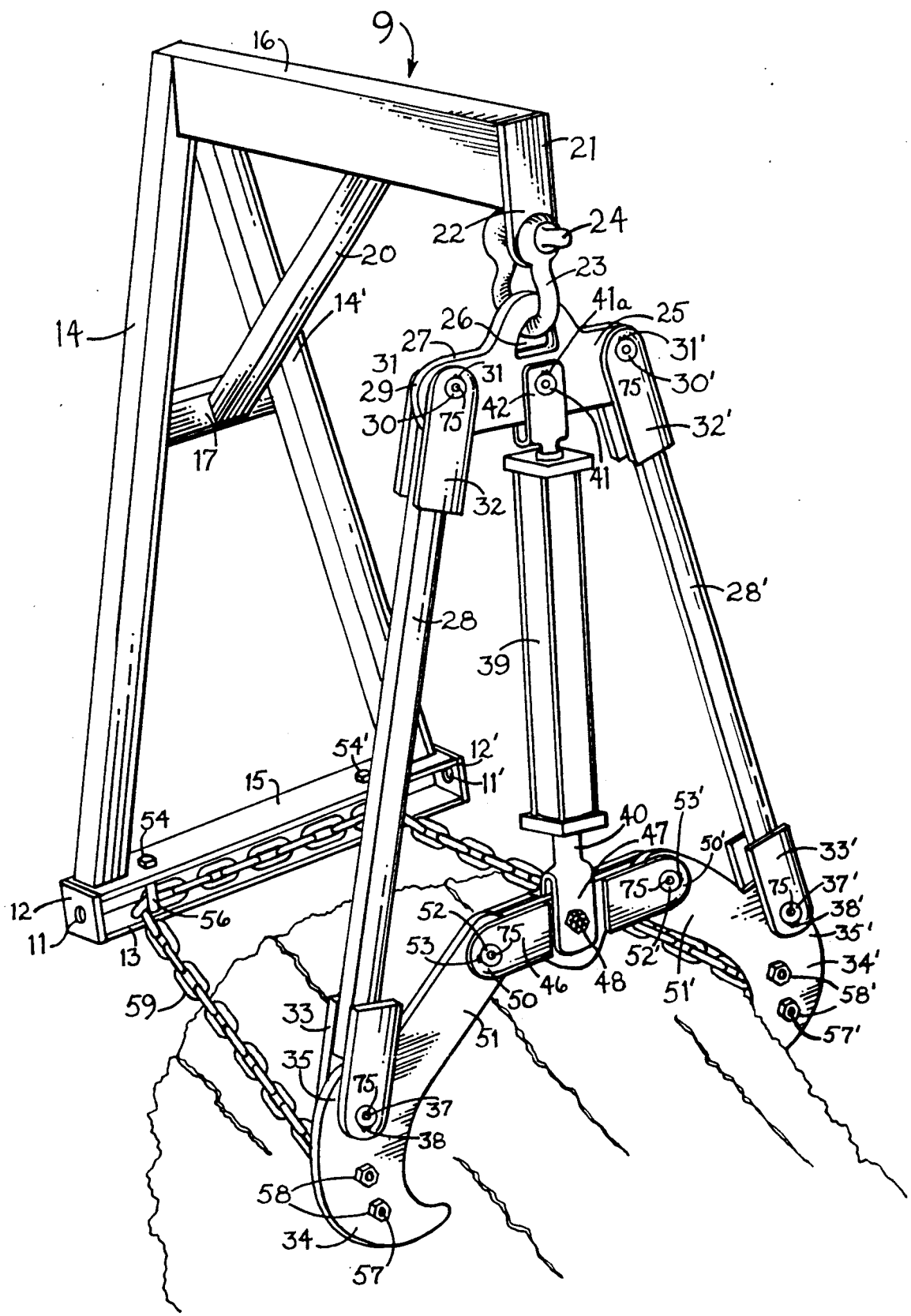
FIG. 3 is a perspective view of the apparatus with the tongs grappling a relatively large load.

A hydraulic cylinder 39 with its piston rod 40 downward, is rotatably suspended from the center of upper crosslink 25 by means of a pin 41 extending through clevis fitting 42 which extends upward from the cylinder 39. Pin 41 is secured by snap rings 41a. Hydraulic hoses 43 and 44 are attached to the cylinder 39 and connected at their other ends to a control box 45, illustrated only in FIG. 2. Hydraulic hoses 78 and 79 connect the hydraulic control box 45 to the tractor hydraulic system. A lower crosslink 46 is rotatably suspended from a clevis fitting 47 at the lower end of the piston rod 40 by means of bolt 48 and nut 49. Lower crosslink 46 has bifurcated fittings 50 and 50' at either end. The shank ends 51 and 51' of tongs 34 and 34' are rotatably attached to fittings 50 and 50' respectively of lower crosslink 46 by means of pins 52 and 52' and snap rings 53 and 53' respectively.

Bolts 54 and 54' extend through channel 13 near either end thereof, and are secured thereto by nuts 55 and 55' respectively. Bolts 54 and 55' are each surrounded by a rotatable sleeve 56 and 56' respectively, extending nearly the length of the bolts 54 and 54' within the channel 13. U-bolts 57 and 57' extend forward from the face of tongs 34 and 34' respectively, and are secured by nuts 58 and 58' on the rearward face of tongs 34 and 34'. Chain 59 is secured by end link 60 to U-bolt 57, and is then passed around sleeve 56. The chain 59 then is passed around sleeve 56' and is secured to U-bolt 57' by end link 60'.

Figure 4:
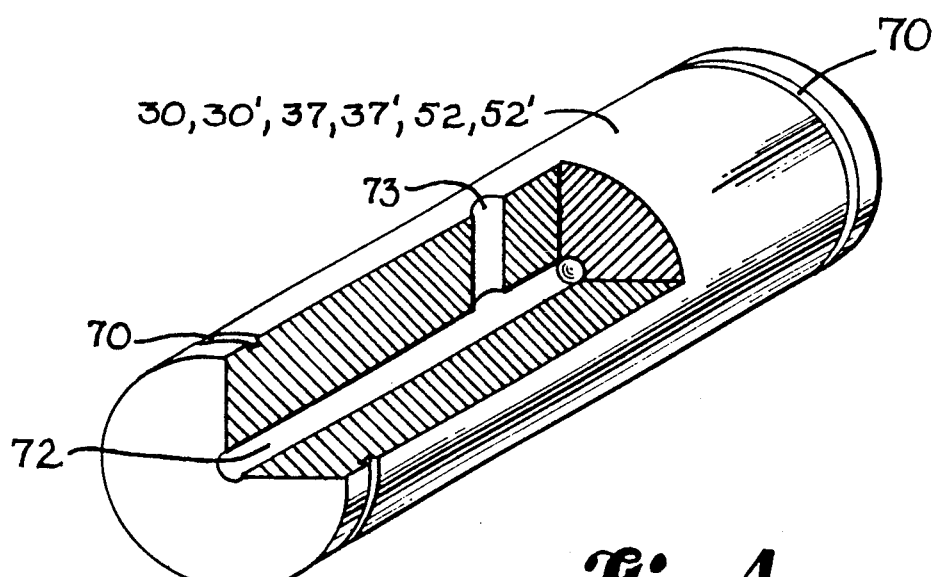
FIG. 4 is a perspective, partially cutaway view of the lubricative connector pin of this invention.
Figure 5:
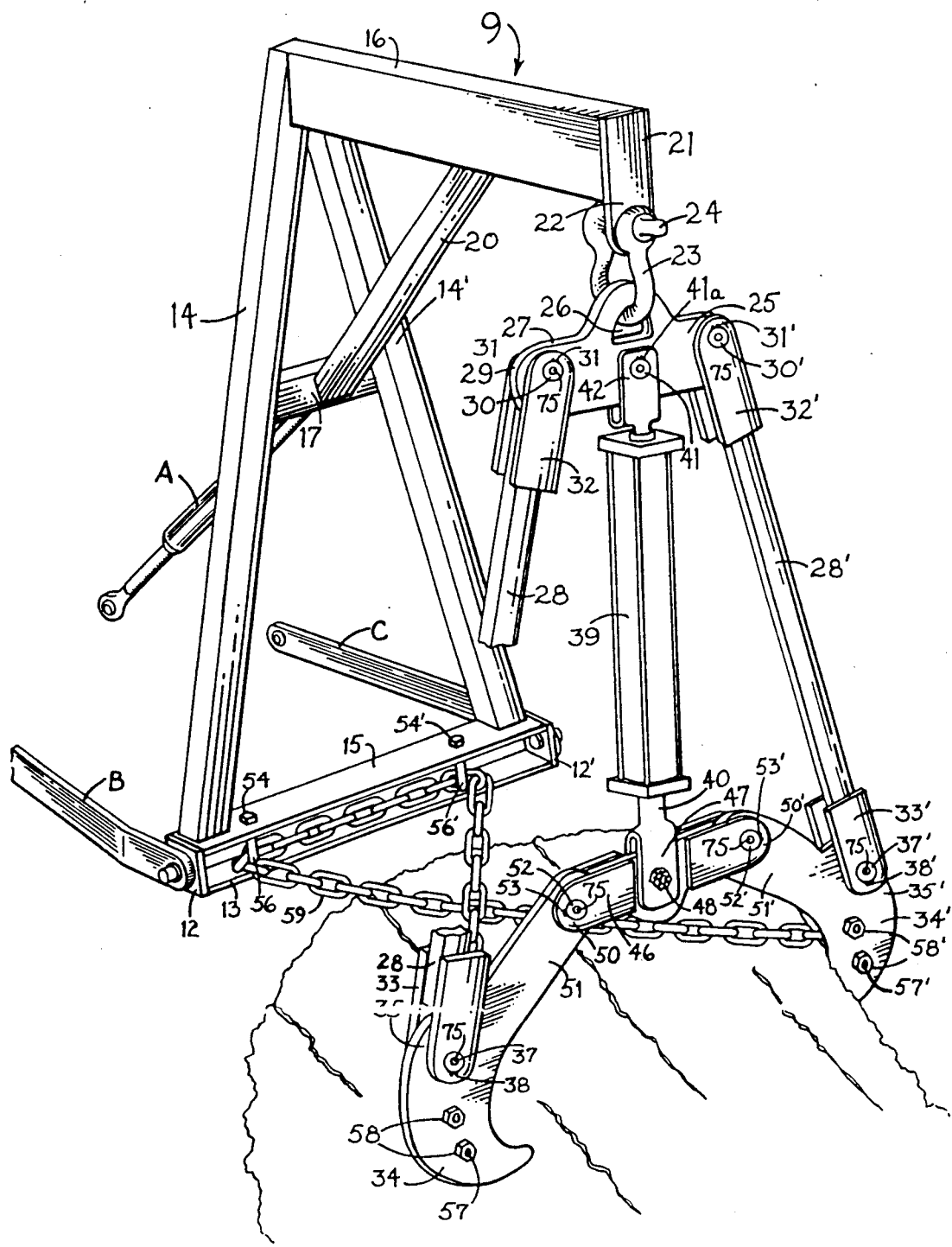
FIG. 5 is a perspective view of the apparatus showing the X-disposition of the chain.

Pins 30, 30', 37, 37', 52 and 52' are identical, and are illustrated in FIG. 4. The pins are designed not only to maintain the proper relationship between parts, such as fitting 32 and upper crosslink 25, for example, but to facilitate lubrication of the joint. Each pin has a sliding fit with relation to the holes in the parts to be connected. When the parts are assembled and are under stress, the single piece between the bifurcated pieces will rotate with respect to the pin. For example, the pin will not rotate with respect to the bifurcated ends of fitting 32, but the upper crosslink 25 will rotate with respect to the pin. Each pin is a cylindrical bar of high-yield-strength steel. The pin is provided with a circumferential slot 70 near each end for the purpose of accepting snap rings to hold the pin in place. A grease passageway 72 is provided along the central axis for just over half the length of the pin. A commercially available grease fitting 75, not illustrated in FIG. 4, is force-fitted into passageway 72. Grease passageway 73 has been drilled radially from the exterior, midway along the length of the pin, into the pin where it intersects with passageway 72. Passageway 72 is sized to receive a commercially available lubrication fitting in the open end of the passageway 72 by means of a force fit.

The control box 45 is a standard, commercially available two-spool box. This allows the operator to use one handle to control rotation of the apparatus, and a handle immediately adjacent to control opening and closing of the tongs.

It can be seen that, because of the large size of the eye 26 in the upper crosslink 25, and the large size of the shackle 23 from which the upper crosslink 25 is suspended, the grapple 10 can pivot to a considerable degree around its centerline, in approximately a 60-degree arc, and can also swing transversely to a considerable degree. In addition, the fact that the distance between the upper crosslink 25 and the lower crosslink 46 can be varied by extending or retracting the piston rod 40, and further that the lower crosslink 46 can pivot transversely, it can be seen that the grapple 10 has the capability to adapt to any shape object the operator is likely to encounter. This design, combined with the chain 59 in which the slack is largely, if not completely, taken up when the load is grappled, enables the operator to grapple any load without the assistance of additional personnel, and to skid the load without imposing additional load on the grapple 10 other than the weight of the load. When the tractor starts to move, the grapple 10 has the ability to make any required adaptation in its position caused by taking up the slack, if any, in the chain 59.

It is an objective of this invention to enable a tractor operator to grapple and skid an object unaided.

It is a further objective of this invention to provide a grapple which will adjust to different sizes and shapes of loads.

It is a further objective of this invention to provide an apparatus which will enable the grapple to remain a reasonable size by removing therefrom the necessity to assume the towing load.

It is a further object of this invention to provide a load grappling and skidding apparatus which can be mounted on a three point hitch of either a truck or tractor.

It is a further objective of this invention to provide a connector pin for the connection of elements which will rotate in parallel planes with respect to each other and which is easy to install and remove, and which facilitates lubrication of the connected joint.

While this invention is susceptible of embodiment in different forms, the drawings and the specification illustrate the preferred embodiment of the invention, with the understanding that the present disclosure is to be considered an exemplification of the principles of the invention, and the disclosure is not intended to limit the invention to the particular embodiment described.

I claim:

1. A load-skidding apparatus for attachment to the three-point hitch of a vehicle comprising:
   a rotatable frame having attachment points for attachment to the three-point hitch, said frame comprising:
     a lower horizontal member with a hitch-cooperating fitting at each end for attachment to the two lower points of the three-point hitch;
     an A-frame extending upward from the lower horizontal member;
     a hitch-cooperating fitting on the A-frame for attachment to the third point of the three-point hitch; and
     a boom extending approximately horizontally from the A-frame;
   a lifting grapple suspended from the boom, said grapple having a first tong and a second tong, each of said tongs having an upper end and a lower end, and said tongs being disposed on opposite sides of the centerline of the boom in an opposing cooperating relationship to each other; and
   a discrete towing means emplaced by the grapple, said towing means comprising;
     a first rotatably-sleeved bolt affixed to the horizontal member on the same side of the centerline of the boom on which the first tong is located;
     a second rotatably-sleeved bolt affixed to the horizontal member on the same side of the centerline of the boom on which the second tong is located; and
     a flexible, inelastic member having a first end and a second end, the first end being attached to the first tong near the lower end of the first tong, thence passing loosely around the first bolt, thence passing loosely around the second bolt, and thence being attached at its second end to the second tong near the lower end of the second tong.

2. The apparatus of claim 1 wherein the grapple further comprises:
   an upper crosslink having a first end and a second end, the upper crosslink being freely suspended at its center from the free end of the boom;
   a hydraulic cylinder assembly comprising a cylinder, a piston slidable therein and a piston rod extending coaxially from the cylinder, the assembly being rotatably suspended from the center of the upper crosslink with the piston rod oriented downwards;
   a lower crosslink rotatably suspended from the piston rod at the center of the lower crosslink, said lower crosslink having a first end and a second end;
   a first bar rotatably suspended at its upper end from the first end of the upper crosslink;
   a second bar rotatably suspended at its upper end from the second end of the upper crosslink;
   said first tong having an upward-extending shank, and said first tong being rotatably connected near its midpoint to the lower end of the first bar, and rotatably connected at the end of its shank to the first end of the lower crosslink;
   said second tong having an upward-extending shank, and said second tong being rotatably connected near its midpoint to the lower end of the second bar, and rotatably connected at the end of its shank to the second end of the lower crosslink; and a means to control the extension and retraction of the piston rod.

3. The apparatus of claim 1 wherein the flexible, inelastic member is a chain.

4. A load-skidding apparatus for attachment to the three-point hitch of a vehicle comprising:

a rotatable frame having attachment points for attachment to the three-point hitch, said frame comprising:

a lower horizontal member with a hitch-cooperating fitting at each end for attachment to the two lower points of the three-point hitch;

an A-frame extending upward from the lower horizontal member;

a hitch-cooperating fitting on the A-frame for attachment to the third point of the three-point hitch; and a boom extending approximately horizontally from the A-frame;

a lifting grapple suspended from the boom, said grapple having a first tong and a second tong, each of said tongs having an upper end and a lower end, and said tongs being disposed on opposite sides of the centerline of the boom in an opposing cooperating relationship to each other; and a discrete towing means emplaced by the grapple, said towing means comprising;

a first rotatably-sleeved bolt affixed to the horizontal member on the same side of the centerline of the boom on which the first tong is located;

a second rotatably-sleeved bolt affixed to the horizontal member on the same side of the centerline of the boom on which the second tong is located; and a flexible, inelastic member having a first end and a second end, the first end being attached to the first tong near the lower end of the first tong, thence loosely passed around the second bolt, thence loosely passed around the first bolt, and thence attached at its second end to the second tong near the lower end of the second tong, thus forming, in plane view, an X-disposition of the flexible, inelastic member between the tongs and the bolts.

* * * * *